United States Patent
Barnette et al.

(10) Patent No.: US 9,787,085 B2
(45) Date of Patent: *Oct. 10, 2017

(54) HOT PLUG DEVICE PROVIDING TURN ON FETS WITH A SOFTSTART CAPABILITY

(71) Applicant: International Business Machines Corporation, Armonk, NY (US)

(72) Inventors: Jamaica L. Barnette, Durham, NC (US); Nicholas Celenza, Durham, NC (US); Brian C. Totten, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 798 days.

This patent is subject to a terminal disclaimer.

(21) Appl. No.: 14/256,213

(22) Filed: Apr. 18, 2014

(65) Prior Publication Data
US 2015/0303683 A1 Oct. 22, 2015

(51) Int. Cl.
*H02H 7/20* (2006.01)
*H02H 9/02* (2006.01)
*G06F 13/40* (2006.01)
*G06F 1/26* (2006.01)
*H02H 9/00* (2006.01)

(52) U.S. Cl.
CPC .............. *H02H 7/20* (2013.01); *G06F 1/266* (2013.01); *G06F 13/4081* (2013.01); *H02H 9/004* (2013.01); *H02H 9/025* (2013.01)

(58) Field of Classification Search
CPC ........... H03K 17/08; H02H 9/02; H02H 9/025
See application file for complete search history.

(56) References Cited

U.S. PATENT DOCUMENTS

| | | | |
|---|---|---|---|
| 4,598,332 A | 7/1986 | Kemeny | |
| 5,831,346 A | 11/1998 | Baumann et al. | |
| 6,084,454 A | 7/2000 | Holst | |
| 8,400,862 B2 | 3/2013 | Tejada | |
| 2003/0042795 A1 | 3/2003 | Veendrick et al. | |
| 2012/0198136 A1 | 8/2012 | Moshayedi et al. | |
| 2012/0229100 A1 | 9/2012 | Trenchs et al. | |
| 2013/0100561 A1 | 4/2013 | Senouci et al. | |
| 2015/0357811 A1* | 12/2015 | Barnette | H02H 9/025 710/304 |

* cited by examiner

*Primary Examiner* — Jeffrey Shin
(74) *Attorney, Agent, or Firm* — Jeffrey L. Streets

(57) ABSTRACT

A hot plug device includes an electronic subsystem and a plurality of main turn on FETs, wherein each main turn on FET includes a gate, a power input for coupling to a power source, and an output for controllably providing power to the electronic subsystem. An auxiliary current path is in parallel with the main turn on FETs and includes a fuse, an impedance element and an auxiliary turn on FET. A turn on controller controls the main turn on FETs and the auxiliary turn on FET. Current is initially through the high impedance auxiliary current path to apply voltage to an output power rail. Subsequently, current is allowed to pass through a plurality of main turn on FETs to the output power rail in response to the output power rail having a voltage exceeding a voltage threshold as a result of using the high impedance auxiliary current path.

17 Claims, 2 Drawing Sheets

HOT PLUG DEVICE PROVIDING TURN ON FETS WITH A SOFTSTART CAPABILITY

BACKGROUND

Field of the Invention

The present invention relates to hot plug devices and circuits controlling power to a hot plug device.

Background of the Related Art

Many systems require the ability to hot plug a device into the system, and control the inrush current seen by the charging of input capacitance. In most technologies there is a balance between charging the capacitance as fast as you can so the FETs are not in a linear mode too long, and not tripping the over current of the regulator or any other upstream power supply. The main issue is where a power rail of the hot plug device has an impedance that is lower than the over current trip point, but high enough to damage a FET if turned on into this impedance. This exposes hot plug mechanisms to cases where, if there is a failure on the rail and the impedance is a soft short, severe power dissipation can occur in the turn on FETs, and can lead to a double fault causing damage in a server environment.

BRIEF SUMMARY

One embodiment of the present invention provides a hot plug device, comprising an electronic subsystem and a plurality of main turn on FETs, wherein each main turn on FET includes a gate, a power input for coupling to a power source, and an output for controllably providing power to the electronic subsystem. The hot plug device further comprises an auxiliary current path in parallel with the main turn on FETs, wherein the auxiliary current path includes a fuse, an impedance element and an auxiliary turn on FET. Still further, the hot plug device comprises a turn on controller having outputs to the gates of the main turn on FETs and a gate of the auxiliary turn on FET.

A further embodiment of the present invention provides a computer program product for controlling in rush current to a hot plug device, the computer program product comprising a computer readable storage medium having program instructions embodied therewith, the program instructions executable by a processor to cause the processor to perform a method. The method comprises directing current from an input power rail of the hot plug device to an output power rail of the hot plug device through a high impedance auxiliary current path, wherein an electronic subsystem of the hot plug device is coupled to the output power rail. The method further comprises allowing current from the input power rail to pass through a plurality of main turn on FETs to the output power rail in response to the output power rail having a voltage that exceeds a voltage threshold as a result of directing current through the high impedance auxiliary current path.

DETAILED DESCRIPTION

Figure 1:
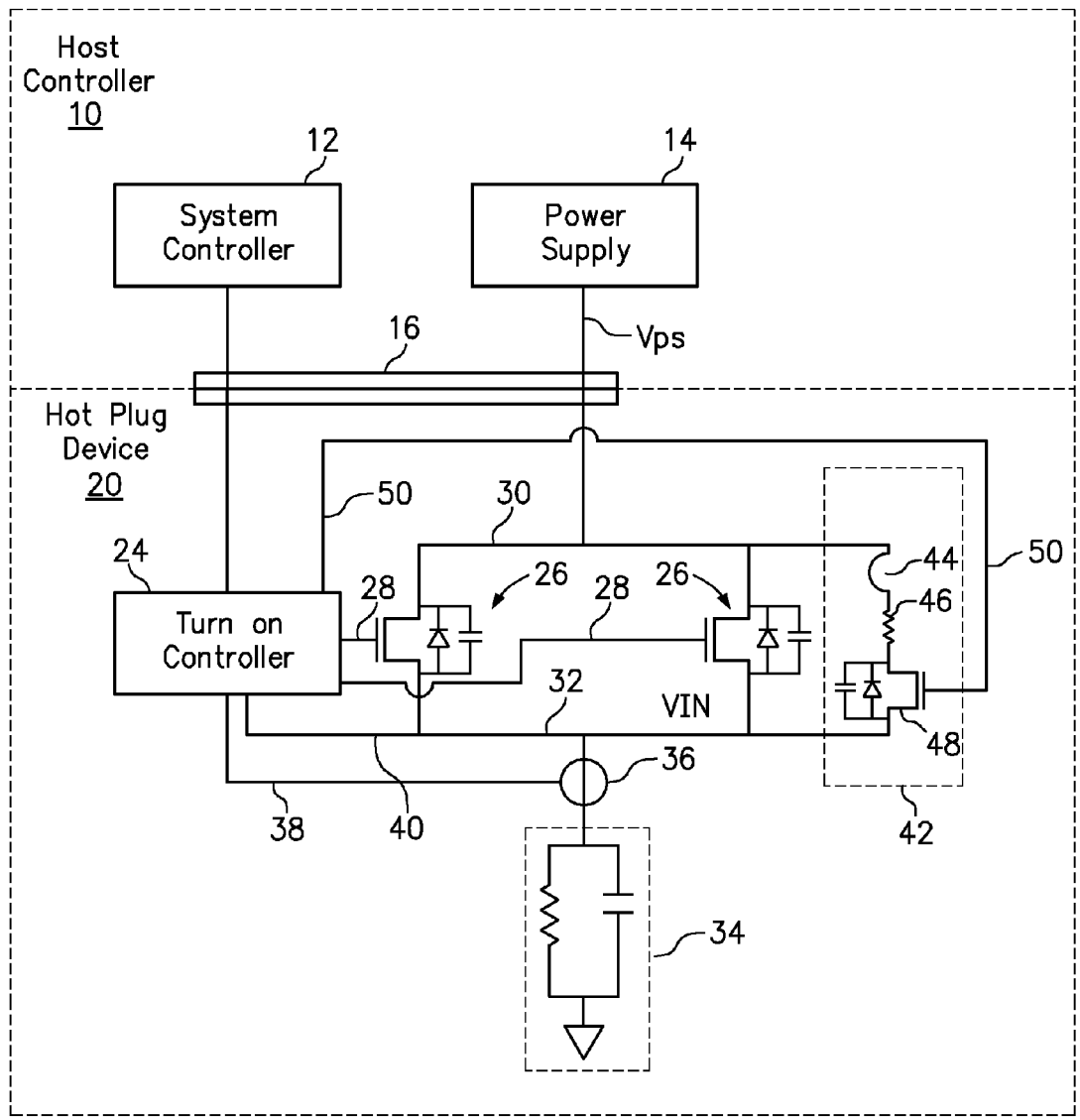
FIG. 1 is a diagram of a hot plug device coupled to a host system.

One embodiment of the present invention provides a hot plug device, comprising an electronic subsystem and a plurality of main turn on FETs, wherein each main turn on FET includes a gate, a power input for coupling to a power source, and an output for controllably providing power to the electronic subsystem. The hot plug device further comprises an auxiliary current path in parallel with the main turn on FETs, wherein the auxiliary current path includes a fuse, an impedance element and an auxiliary turn on FET. Still further, the hot plug device comprises a turn on controller having outputs to the gates of the main turn on FETs and a gate of the auxiliary turn on FET.

A hot plug device is an electronic device that can be added to a host system without significant interruption in the operation of the system. A typical hot plug device will have a connector with pins that include an electrical ground, power and any number of signal lines. Accordingly, the physical connection of the hot plug device to the host system puts the hot plug device into communication with a ground wire, a power source and a signal transmitter, receiver or transceiver.

The hot plug device includes a plurality of main turn on FETs that control the flow of electrical current from the power source to the electronic subsystem of the hot plug device. The current pathway through the plurality of main turn on FETs may be referred to as the main current pathway and is preferably a low impedance current pathway. The turn on controller that may selectively provide a turn on signal to the gate of each of the main turn on FETs. Furthermore, the turn on controller may be in communication with a system controller of the host system, and take steps to turn on the hot plug device in response to an instruction from the system controller. In one embodiment, the hot plug device includes a connector for coupling the hot plug device to a host system, wherein the connector includes a conductor for establishing communication between the turn on controller and a system controller of the host system and a conductor for establishing communication between the power input and a power source of the host system.

The auxiliary current path is connected between an input rail to the main turn on FETs and an output rail from the main turn on FETs, so that the auxiliary current path is in parallel with the main current pathway. The auxiliary current path may include, in series, a fuse, an impedance element (resistor), and an auxiliary FET. The fuse may be used to disconnect power in case of a fault on the hot plug device. The known impedance of the impedance element establishes a voltage threshold in the output rail that will indicate to the turn on controller that the impedance of the output rail is fine (i.e., that there is no short on the output rail). The auxiliary FET is initially turned on to provide power from the input rail to the output rail through the auxiliary current path when the hot plug device is first being turned on. The auxiliary FET may be turned off when the main turn on FETs are turned on, or turned off in response to the failure of the output rail to achieve a voltage threshold within a timeout period.

The hot plug device preferably includes a voltage feedback line allowing the turn on controller to detect or measure an output voltage to the electronic subsystem. Accordingly, the turn on controller may be configured to provide a turn on signal to the auxiliary FET until detecting that the output voltage on the output rail to the electronic subsystem has reached a voltage threshold. The turn on controller may also be configured to provide a turn on signal to the plurality of main turn on FETs in response to detecting that the output voltage on the output rail to the electronic subsystem has reached the voltage threshold.

Non-limiting examples of the hot plug device may include an electronic subsystem selected from a graphics processing subsystem, a memory subsystem, and a network interface subsystem. Furthermore, the turn on controller may include or perform additional functions and the functions of the turn on controller may be incorporated into other components of the hot plug device.

Another embodiment of the present invention provides a method of controlling the inrush current to a hot plug device. The method comprises directing current from an input power rail of the hot plug device to an output power rail of the hot plug device through a high impedance auxiliary current path, wherein an electronic subsystem of the hot plug device is coupled to the output power rail. The method further comprises allowing current from the input power rail to pass through a plurality of main turn on FETs to the output power rail in response to the output power rail having a voltage that exceeds a voltage threshold as a result of directing current through the high impedance auxiliary current path.

In one option, the method may include preventing current from the input power rail passing to the output power rail in response to the voltage of the output power rail failing to exceed the voltage threshold during a timeout period after initially directing current through the high impedance auxiliary current path. The failure of the voltage on the output power rail to reach the voltage threshold may indicate that the output power rail has an electrical short, such that the main current pathway of the hot plug device should not be turned on.

Furthermore, the method may include a turn on controller monitoring the voltage on the output power rail, wherein directing current through the high impedance auxiliary current path includes the turn on controller sending a turn on signal to the auxiliary turn on FET, and wherein allowing current to pass through a plurality of main turn on FETs includes the turn on controller sending a turn on signal to the plurality of main turn on FETs.

The hot plug device is preferably connected to a host system, without any significant interruption of the operation of the host system, so that the turn on controller is in communication with a system controller of the host system and the input power rail is in communication with a power source of the host system. Upon detecting that the hot plug device has been connected, the system controller of the host system may send a turn on instruction to the turn on controller of the hot plug device.

A further embodiment of the present invention provides a computer program product for controlling in rush current to a hot plug device, the computer program product comprising a computer readable storage medium having program instructions embodied therewith, the program instructions executable by a processor to cause the processor to perform a method. The method comprises directing current from an input power rail of the hot plug device to an output power rail of the hot plug device through a high impedance auxiliary current path, wherein an electronic subsystem of the hot plug device is coupled to the output power rail. The method further comprises allowing current from the input power rail to pass through a plurality of main turn on FETs to the output power rail in response to the output power rail having a voltage that exceeds a voltage threshold as a result of directing current through the high impedance auxiliary current path.

The foregoing computer program product may further include program instructions for implementing or initiating any one or more aspects of the methods described herein. Accordingly, a separate description of the methods will not be duplicated in the context of a computer program product.

FIG. 1 is a diagram of a hot plug device 20 coupled to a host system 10. The host system 10 includes a system controller 12 and a power source 14. For example, the host system may be a compute node, server, network switch, or other electronic device without limitation, and may include additional components not shown. A connector 16 may include pins from both the system controller 12 and the power source 14 for connection to the hot plug device 20. In one embodiment, the system controller 12 may be a management module of the host system 10, such as a baseboard management controller of a compute node or server, or a field programmable gate array (FPGA).

The hot plug device 20 also includes a connector 22, which is configured to selectively mate with the connector 16 of the host system 10. Accordingly, the connectors 16, 22 provide a connection between the system controller 12 and a turn on controller 24 of the hot plug device 20, as well as a connection between the power source 14 and the input rail 30 that is connected to the source inputs of a plurality of turn on FETS 26 that are part of the hot plug device 20.

The turn on controller 24 has signal lines 28 coupled to a gate of each of the main turn on FETs 26 and provides turn on signals to the FETs 26. When a turn on signal is being applied to the gate of the main turn on FETs 26, current from the input rail 30 (originating from power source 14) is allowed to pass through the FETs 26 to the output rail 32. The output rail 32 is, in turn, coupled to an electronic subsystem 34, which is only schematically shown. In this manner, the turn on controller 24 controls the supply of power to the electronic subsystem 34.

The hot plug device 20 further includes an auxiliary current path 42 between the input rail 30 and the output rail 32 (in parallel with the main turn on FETs 26). The auxiliary current path 42 includes, in series, a fuse 44, an impedance (resistor) 46, and an auxiliary FET 48. The fuse 44 is used to disconnect power in case of a fault on the hot plug device 20 that might cause the device to never turn on again. The known impedance of the impedance element 46 establishes a voltage threshold in the output rail 32 that will indicate to the turn on controller 24 that the impedance of the output rail is fine (i.e., there is no short on the output rail). The auxiliary turn on FET 48 is in communication with the turn on controller 24 over the signal line 50 and is used to control power from the input rail 30 to the output rail 32 through the auxiliary current path 42.

A current sensor 36 provides a signal to the turn on controller 24 through a signal line 38 and a voltage feedback line 40 allows the turn on controller 24 to monitor the voltage on the output rail 32. Accordingly, the turn on controller 24 can monitor the current and voltage on the output rail 32.

Figure 2:
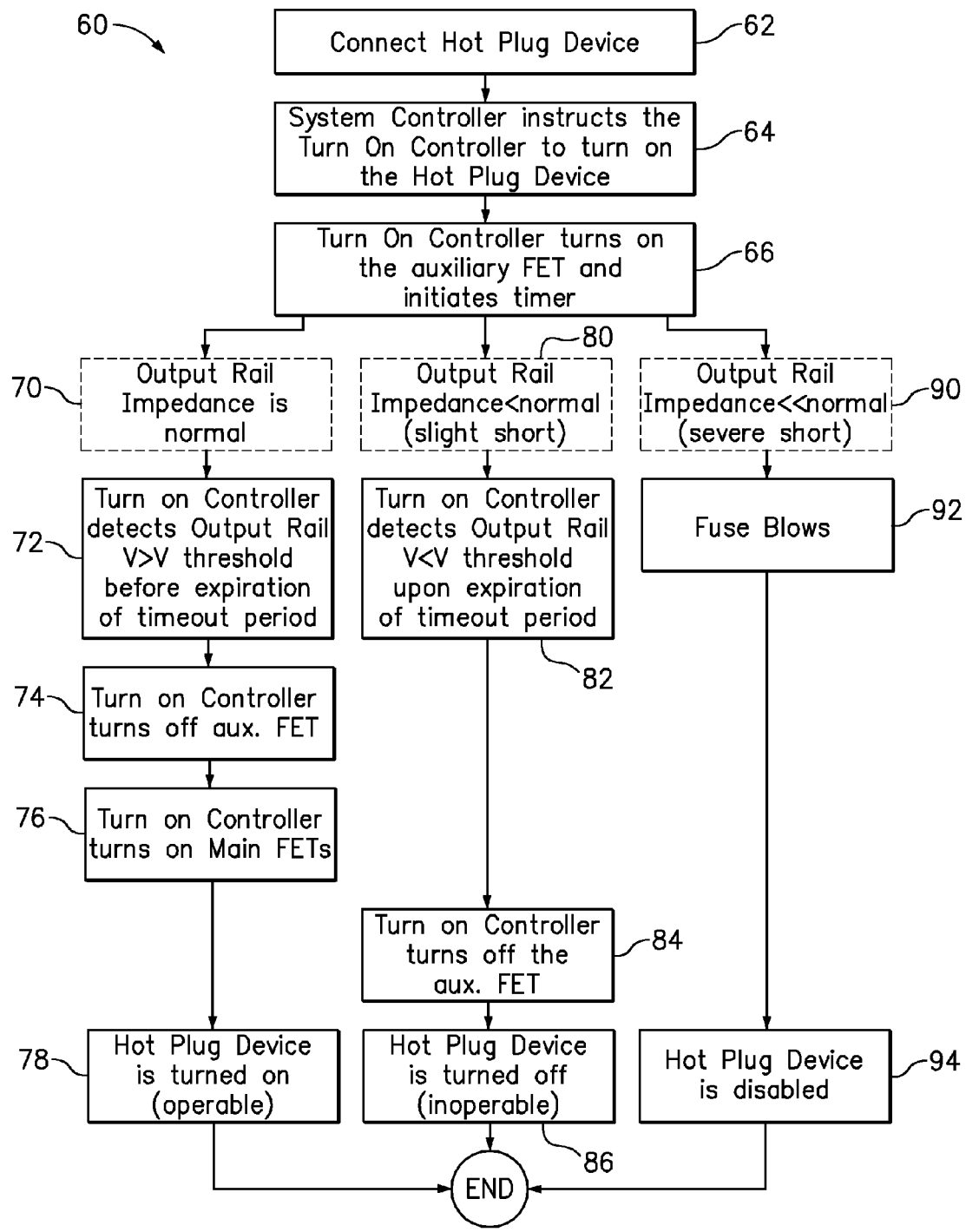
FIG. 2 is a flowchart of a method for controlling the in rush current to a hot plug device.

FIG. 2 is a flowchart of a method 60 for controlling the in rush current to a hot plug device consistent with FIG. 1. In step 62, a hot plug device is connected to a host system. A system controller may then, in step 64, instruct the turn on controller to turn on the hot plug device. Accordingly, the turn on controller turns on the auxiliary FET and initiates a timer in step 66.

The method 60 may then take any one of three branches depending upon the condition of the output rail of the hot plug device. Specifically, the output rail may have a normal impedance (condition 70), an impedance that is somewhat less than normal indicating a slight short (condition 80), or an impedance that is much less than normal indicating a severe short (condition 90).

When the output rail has a normal impedance (condition 70), the turn on controller detects that the voltage on the output rail has exceeded a voltage threshold before expiration of a timeout period in step 72. Accordingly, the turn on controller turns off the auxiliary FET in step 74 and turns on the main turn on FETs in step 76 so that the voltage in the output rail will reach a target operating voltage for the electronic subsystem. The hot plug device is then fully turned on and operable in step 78.

When the output rail has an impedance that is somewhat less than normal indicating a slight short (condition 80), the turn on controller detects that the output rail voltage is less than the voltage threshold upon expiration of the timeout period in step 82. Then, the turn on controller turns off the auxiliary FET in step 84, such that the hot plug device is turned off and inoperable in step 86. Note that the main turn on FETs do not get turned on, thus preventing damage or a dangerous condition.

When the output rail has an impedance that is much less than normal indicating a severe short (condition 90), a fuse will blow in step 92. With the fuse blown, the hot plug device is disable in step 94 since no current can pass through the auxiliary current path and the output rail can't reach the threshold voltage necessary to enable the main turn on FETs to be turned on. While the hot plug device is disabled, the fuse prevents damage or a dangerous condition.

In one example, the impedance of the output rail (such as a 12V output rail) is highly capacitive, which has a very high real component of impedance in the kilo-ohm range. The turn on controller monitors the impedance of the output rail, and determines whether to enable the low impedance current paths controlled by the main turn on FETs. If the output rail has an acceptable impedance level, then the main turn on FETs in the low impedance paths are turn on so that the output rail will charge to its full operating voltage. However, if the impedance of the 12V output rail is too low (such as where the rail has a short to ground), then the 12V output rail will not be able to charge to a voltage threshold at which the turn on controller would normally turn on the main turn on FETs. After a period of time that the output rail fails to reach the voltage threshold, the turn on controller will time out, turn off the signal to the auxiliary FET and prevent the hot plug device from turning on. Furthermore, if the short on the output rail is severe enough (i.e., the impedance is too low), the auxiliary current path will sink so much current that the fuse in the auxiliary current path will blow, thus preventing the hot plug device from powering up again.

Advantageously, the low impedance paths through the main turn on FETs are not exposed to any high power dissipation during power up of the hot plug device, since the main turn on FETs are not turned on until after the voltage on the output rail has already reached a voltage threshold. Turning on the main turn on FETs after the output rail has already reached the voltage threshold ensures that there is no substantial current flow through the main turn on FETs during the period that the main turn on FETs are being turned on. Therefore, the main turn on FETs do not need to adhear to strict inrush current specifications, such that the main turn on FETs may be less expensive than the main turn on FETs required without having an auxiliary current path according to the present invention.

The present invention may provide a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A hot plug device, comprising:
   an electronic subsystem;
   a plurality of main turn on FETs, each main turn on FET including a gate, a power input for coupling to a power source, and an output for controllably providing power to the electronic sub system;
   an auxiliary current path in parallel with the main turn on FETs, the auxiliary current path including a fuse, an impedance element and an auxiliary turn on FET; and
   a turn on controller having outputs to the gates of the main turn on FETs and a gate of the auxiliary turn on FET.

2. The hot plug device of claim 1, further comprising:
   a current sensor monitoring an amount of current being provided to the subsystem and providing a current signal to the turn on controller.

3. The hot plug device of claim 1, further comprising:
   a connector for coupling the hot plug device to a host system, wherein the connector includes a conductor for establishing communication between the turn on controller and a system controller of the host system and a conductor for establishing communication between the power input and a power source of the host system.

4. The hot plug device of claim 1, wherein the fuse, the impedance element and the auxiliary turn on FET are electrically in series.

5. The hot plug device of claim 1, wherein the electronic subsystem is selected from a graphics processing subsystem, a memory subsystem, and a network interface subsystem.

6. The hot plug device of claim 1, further comprising:
   a voltage feedback line allowing the turn on controller to detect an output voltage to the electronic subsystem.

7. The hot plug device of claim 6, wherein the turn on controller is configured to provide a turn on signal to the auxiliary FET until detecting that the output voltage to the electronic subsystem has reached a voltage threshold.

8. The hot plug device of claim 7, wherein the turn on controller is configured to provide a turn on signal to the plurality of main turn on FETs in response to detecting that the output voltage to the electronic subsystem has reached the voltage threshold.

9. The hot plug device of claim 1, wherein the auxiliary FET is a PFET.

10. A computer program product for controlling in rush current to a hot plug device, the computer program product comprising a computer readable storage medium having program instructions embodied therewith, the program instructions executable by a processor to cause the processor to perform a method comprising:

directing current from an input power rail of the hot plug device to an output power rail of the hot plug device through a high impedance auxiliary current path, wherein an electronic subsystem of the hot plug device is coupled to the output power rail; and allowing current from the input power rail to pass through a plurality of main turn on FETs to the output power rail in response to the output power rail having a voltage that exceeds a voltage threshold as a result of directing current through the high impedance auxiliary current path.

11. The computer program product of claim 10, the method further comprising:
preventing current from the input power rail passing to the output power rail in response to the voltage of the output power rail failing to exceed the voltage threshold during a timeout period after initially directing current through the high impedance auxiliary current path.

12. The computer program product of claim 10, the method further comprising:
a turn on controller monitoring the voltage on the output power rail, wherein directing current through the high impedance auxiliary current path includes the turn on controller sending a turn on signal to an auxiliary turn on FET in the high impedance auxiliary current path, and wherein allowing current to pass through a plurality of main turn on FETs includes the turn on controller sending a turn on signal to the plurality of main turn on FETs.

13. The computer program product of claim 10, wherein the high impedance auxiliary current path includes a fuse, an impedance element and an auxiliary turn on FET.

14. The computer program product of claim 10, the method further comprising:
coupling the input power rail to a 12 volt power source.

15. The computer program product of claim 10, wherein each main turn on FET includes a gate, a power input for coupling to the input power rail, and an output coupled to the output power rail.

16. The computer program product of claim 10, the method further comprising:
connecting the hot plug device to a host system so that the turn on controller is in communication with a system controller of the host system and the input power rail is in communication with a power source of the host system.

17. The computer program product of claim 10, wherein the electronic subsystem is selected from a graphics processing subsystem, a memory subsystem, and a network interface subsystem.

\* \* \* \* \*